(12) United States Patent
Nakayama et al.

(10) Patent No.: US 6,652,612 B2
(45) Date of Patent: Nov. 25, 2003

(54) SILICA PARTICLES FOR POLISHING AND A POLISHING AGENT

(75) Inventors: Kazuhiro Nakayama, Fukuoka-ken (JP); Akira Nakashima, Fukuoka-ken (JP); Michio Komatsu, Fukuoka-ken (JP)

(73) Assignee: Catalysts & Chemicals Industries Co., Ltd., Kawasaki (JP)

( * ) Notice: Subject to any disclaimer, the term of this patent is extended or adjusted under 35 U.S.C. 154(b) by 0 days.

(21) Appl. No.: 10/291,643

(22) Filed: Nov. 12, 2002

(65) Prior Publication Data
US 2003/0089045 A1 May 15, 2003

(30) Foreign Application Priority Data
Nov. 15, 2001 (JP) ........................................ 2001-349630

(51) Int. Cl.$^7$ ............................ C01B 33/12; C09K 3/14; C09G 1/02
(52) U.S. Cl. ............................. 51/308; 106/3; 106/482; 423/335
(58) Field of Search .............................. 51/308; 106/3, 106/482; 423/335

(56) References Cited

U.S. PATENT DOCUMENTS

| 4,664,679 A | * | 5/1987 | Kohyama et al. ............. 51/308 |
| 5,591,797 A | * | 1/1997 | Barthel et al. ............... 524/493 |
| 6,387,531 B1 | * | 5/2002 | Bi et al. ..................... 428/570 |

FOREIGN PATENT DOCUMENTS

| EP | 1122212 A2 | * | 8/2001 |
| JP | 9-324174 | | 12/1997 |

* cited by examiner

Primary Examiner—Michael Marcheschi
(74) Attorney, Agent, or Firm—Kanesaka & Takeuchi

(57) ABSTRACT

Silica particles for polishing have a three-dimensional polycondensation structure with an average particle diameter in a range from 5 to 300 nm. The silica particles have residual alkoxy groups therein and a carbon content in a range from 0.5 to 5 weight % retained in the residual alkoxy groups.

7 Claims, No Drawings

SILICA PARTICLES FOR POLISHING AND A POLISHING AGENT

TECHNICAL FIELD

The present invention relates to silica particles for polishing usefully available in forming a metal wiring layer in a semiconductor integrated circuit for smoothing a surface of a substrate thereof and a polishing agent (or a polishing material) containing the particles for polishing.

BACKGROUND TECHNOLOGY

Various types of integrated circuits are used in computers and various types of electronic equipments, and a higher degree of integration is required in association with the tendency for higher performances of the circuits.

In the circumstances as described above, multi-layered wiring is used, for instance, in semiconductor integrated circuits to improve the integration degree of semiconductor integrated circuits, and the multi-layered wiring is usually manufactured by forming a thermally oxidized film as a first insulating film on a substrate comprising, for instance, silicon; then forming a first wiring layer comprising, for instance, an aluminum film; coating an inter-layer insulating film comprising, for instance, a silica film or a silicon nitride film by means of such methods as the CVD method or plasma CVD method; forming a silica insulating film for planarizing the inter-layer insulating film by means of the SOG method; coating a second insulating film on the silica insulating film, if required; and finally forming a second wiring layer.

In the wiring comprising an aluminum film is sometimes oxidized with the resistance value increased in spattering for forming the multi-layered wiring, which may in turn causes a conduction fault. Further as the wiring width can not be made smaller, there has been a limit in forming an integrated circuit with a higher integration degree. Further, recently in a long range wiring such as a clock line or a data bus line, the wiring resistance becomes larger in association with increase of the chip size, and an electric signal propagation delay time (RC delay time=resistance×capacity) disadvantageously increases. To cope with this problem, it is required to provide wiring with a material having a lower resistance value.

It has also been proposed to use Cu in place of Al or aluminum alloy used in the conventional technology for wiring, and for instance, there has been known a method, in which a wiring groove is previously prepared in an insulating film on a substrate and then a Cu wiring is formed by the electrolytic plating method or the CVD method.

In the wiring pattern formation using such material as Cu, machining by the dry etch method can hardly be performed, so that the Damascene process using a chemical and mechanical polishing method (described as CMP method hereinafter), and in this case, a wiring groove is previously formed in an insulating film on a substrate, and then a copper wire is buried in the wiring groove by means of the electrolytic plating method or the CVD method with an upper edge face polished by the CMP method for planarizing it to form the wiring. For instance, an inter-wiring layer film (an insulating film) is formed on a surface such as a silicon wafer with a groove pattern for metal wiring formed thereon, and further a barrier metal layer comprising, for instance, TaN is formed by the spattering method or the like, if necessary, and finally a copper wire for the metal wiring is provided by the CVD method or other appropriate method.

When the barrier metal layer comprising such material as TaN is provided, such troubles as lowering of the insulating capability of the inter-layer insulating film caused by dispersion of or corrosion by copper or other impurities can be prevented, and further adhesiveness between the interlayer insulating film and copper can be enhanced.

Then the unnecessary copper metal film and barrier metal film (which may sometimes be called as a sacrifice layer) formed outside the groove are polished by the CMP method, and at the same time the upper surface of the substrate is planarized as much as possible to leave a metal film in the groove, and thus the copper wiring and circuit pattern being formed.

In the CMP method, generally a polishing pad is placed on a round platen having a rotating mechanism, a work to be polished is rotated in the state where a polishing material is being dripped from a position above a center of the polishing pad, the work is pressed and contacted to the polishing pad, and the copper and barrier metal layers on the common plane are polished away.

As irregularities due to a groove pattern for wiring formed on the under insulating film is present on a surface of the work to be polished, the surface is required to be polished down to the common plane by removing mainly the convex sections for obtaining a planarized surface.

The polishing material used in the CMP method generally comprises spherical particles for polishing comprising oxides of metals such as silica and alumina and having the average particle diameter of about 200 nm; an oxidizing agent for raising the rate of polishing the metals used for wiring and circuit patterns, and an additive such as an organic acid; and a solvent such as deionized water.

In the conventional technology of polishing with silica or alumina, there is the disadvantage that scratches such as flaws or stripes still remain, or are newly generated after the polishing process.

Japanese Patent Laid-Open Publication No. HEI 9-324174 discloses the composite particles comprising organic materials and inorganic materials usefully available for suppressing generation of scratches, and the composite particles contain an organic polymer skeletal structure and a polysiloxane skeletal structure containing in the molecular structure an organic silicon directly and chemically bonding to at least one carbon atom in the organic polymer skeletal structure, and a content of $SiO_2$ constituting the polysiloxane skeletal structure is 25 weight % and more.

Hardness of the composite particles comprising organic and inorganic materials described above varies according to a content of $SiO_2$ constituting the polysiloxane skeletal structure, and in a case where a content of organic polymer is large and a content of $SiO_2$ is small, scratches are generated little, but the required polishing rate is low. On the contrary, in a case where a content of organic polymer is small and a content of $SiO_2$ is large, the polishing rate is high, but starches will easily be generated. Even if the $SiO_2$ content is made large within the range where scratches are not generated, the sufficient polishing rate can not be achieved, which is a bottleneck in this technology.

DISCLOSURE OF THE INVENTION

It is an object of the present invention to provide particles for polishing capable of suppressing generation of the so-called scratches and also polishing and planarizing a surface of a substrate at a sufficient polishing rate and also to provide a polishing agent or a polishing material containing the particles for polishing.

The silica particles for polishing according to the present invention are characterized in that the average particle diameter is in the range from 5 to 300 nm and the carbon content is in the range from 0.5 to 5 weight %.

The silica particles for polishing should preferably have the 10%-compressive elasticity modulus in the range from 500 to 3000 kgf/mm$^2$. The Na content of silica particles for polishing should preferably be less than 100 ppm as converted to Na.

A polishing agent or a polishing material according to the present invention contains the silica particles for polishing.

BEST MODE FOR CARRYING OUT THE INVENTION

[Particle for polishing]

The average particle diameter of the silica particles for polishing according to the present invention is preferably in the range from 5 to 300 nm, and more specifically in the range from 10 to 200 nm, although it depends on such factors as required polishing rate, and polishing precision. When the average particle diameter is less than 5 nm, stability of the dispersion liquid of silica particles is apt to become unstable, and the particle size is too small to realize the sufficient polishing rate. When the particle size is more than 300 nm, scratches will remain and the desired smoothness may not be achieved, although it depends on types of substrates and insulating films.

A content of carbon in the silica particles for polishing should preferably be in the range from 0.5 to 5 weight %, and more specifically in the range from 0.7 to 4 weight %. When the carbon content is less than 0.5 weight %, for instance, residual alkoxy group is not present, siloxane bonding proceeds, the particles are hard (with the high elasticity modulus), and therefore scratches remain or are generated anew even though the polishing rate is high, so that smoothness of the polished surface is insufficient. On the other hand, when the carbon content is over 5 weight %, a quantity of residual alkoxy group increases, so that the particles become relatively soft (with the low elasticity modulus) and a sufficient polishing rate can not be achieved.

The 10%-compressive elasticity modulus of the silica particles for polishing should preferably be in the range from 500 to 3000 kgf/mm$^2$, and more preferably in the range from 600 to 2000 kgf/mm$^2$. When the 10%-compressive elasticity modulus is less than 500 kgf/mm$^2$, the particles are relatively soft, so that a sufficient polishing rate can not be achieved. When the 10%-compressive elasticity modulus is over 3000 kgf/mm$^2$, the particles are too hard, and scratches remain or are generated anew after polishing and smoothness of the polished surface is insufficient even though the polishing rate is high.

The method of assessing the 10%-compressive elasticity modulus employed in the present invention is as described below. The 10%-compressive elasticity modulus is obtained with a micro compression tester (manufactured by Shimazu Seisakusho K. K.: MCTM-200) as a tester and with one particle having the particle diameter of D as a sample by applying a load at a prespecified loading rate, deforming the particles until the compression displacement reaches 10% of the particle diameter, measuring the load and the compression displacement (mm) at the 10% displacement, and substituting the particle diameter, and the measured compression load and compression displacement into the following equation:

$$K = (3/\sqrt{2}) \times F \times S^{-3/2} \times D^{-1/2}$$

wherein K indicates the 10%-compressive elasticity modulus (kgf/mm$^2$), F indicates a compression load (kgf), S indicates a compression displacement (mm), and D indicates a particle diameter (mm).

The particle diameter of silica particles for polishing allowable in the present invention is small, namely in the range from 5 to 300 nm, so that the particle diameter can hardly be measured with the tester, and even if the measurement is possible, the precision may be insufficient. Therefore, in the examples described below, the samples are prepared in the same manner as that employed for manufacturing the silica particles for polishing except the point that particles with particularly large diameter are used as the samples. Specifically 10 pieces of particles having the particle diameter in the range from 2 to 3 μm dried for 24 hours under 105° C. were selected, and an average value measured thereof was used as the 10%-compressive elasticity modulus for the silica particles for polishing.

Na content in the silica particles for polishing as converted to Na in SiO$_2$ should be less than 100 ppm, preferably less than 50 ppm, and more preferably less than 20 ppm. When the Na content is over 100 ppm, Na remains on the substrate polished with the silica particles, and the Na may cause insulation fault or short circuitry in a circuit formed on the semiconductor substrate, and in that case the dielectric constant of a film provided for insulation (insulating film) drops while impedance in the metal wiring increases, which may in turn cause such troubles as a response delay or increase in power consumption. Further sometimes Na ions may move (disperse), which may cause the troubles as described above when the substrate is used for a long time.

[Preparation of silica particles for polishing]

There are no specific restrictions over the method of manufacturing the silica particles for polishing according to the present invention on the condition that particles with the carbon content as described above and preferably with a prespecified 10%-compressive elasticity modulus are obtained. Especially the method disclosed by the present applicant in Japanese Patent Laid-Open Publication No. HEI 11-61043 can advantageously be used for this purpose, and in this method, monodispersed silica particles with the average particle diameter in the range from 5 to 300 nm are obtained during the process for obtaining short fibrous silica.

The method of manufacturing polyorganosiloxane disclosed in Japanese Patent Laid-Open Publication No. HEI 9-59384 can advantageously be used, and in this method particles with the average particle diameter in the range from 5 to 300 nm can be obtained.

A specific method of manufacturing silica particles for polishing is described below.

The silica particles for polishing are obtained by hydrolyzing one or more alkoxysilanes generally expressed by the following formula [1] and then subjecting the particles to hydrothermal processing under a temperature of 150° C. or less according to the necessary:

$$X_n Si(OR)_{4-n} \qquad (1)$$

wherein X indicates a hydrogen atom, a fluorine atom, an alkyl group having 1 to 8 carbon atoms, an aryl group, or a vinyl group; R indicates a hydrogen atom, an alkyl group having 1 to 8 carbon atoms, an aryl group, or a vinyl group; and n is an integral number from 0 to 3.

The alkoxysilanes expressed by the formula [1] include tetramethoxysilane, tetraethoxysilane, tetraisopropoxysilane, tetrabutoxysilane, tetoraoctylsilane, methyltrimethoxysilane, methytriethoxysilane, methyltriisopropoxysilane, ethyltrimethoxysilane, ethyltriethoxysilane, ethyl-triisopropoxysilane, octyltrimethoxysilane, octyltriethoxysilane, vinyltrimethoxysilane, vinyltriethoxysilane, phenyltrimethoxysilane, phenyltriethoxysilane, trimethoxysilane, triethoxysilane, triisopropoxysilane, fluorotrimethoxysilane, fluorotriethoxysilane, dimethyldimethoxysilane, dimethyldiethoxysilane, diethyidimethoxysilane, diethyidiethoxysilane, dimethoxysilane, diethoxysilane, difluorodimethoxysilane, difluorodiethoxysilane, trifluoromethyltrimethoxysilane, and trifluoromethyltriethoxysilane.

Hydrolysis of the alkoxysilanes as described above is performed under the existence of water, an organic solvent, or a catalyst.

The organic solvents available for this purpose include, but not limited to, alcohols, ketones, ethers, and esters, and more specifically the organic solvents include, for instance, alcohols such as methanol, ethanol, propanol, and butanol; ketones such as methylethyl ketone, and methylisobutyl ketone; glycol ethers such as methyl cellosolve and ethyl cellosolve, and propylene glycol monopropyl ether; glycols such as ethylene glycol, propylene glycol, and hexylene glycol; and esters such as methyl acetate, ethyl acetate, methyl lactate, and ethyl lactate.

The catalyst includes basic compounds such as ammonia, amine, alkali metal hydrides, quarternary ammonium compounds, and amine-based coupling agents. The alkali metal hydrides may be used as a catalyst, but in that case, hydrolysis of an alkoxy group in the alkoxysilane is promoted, so that a quantity of residual alkoxy groups (carbon) in the obtained particles decreases and the 10%-compressive elasticity modulus becomes higher than 5000 kgf/mm$^2$, and therefore the polishing rate is high, but scratches may be generated anew, and further Na content becomes disadvantageously high.

A quantity of water required for hydrolysis of the alkoxysilane is in the range from 0.5 to 50 moles per mole of Si—OR group constituting alkoxysilane, and preferably in the range from 1 to 25 moles. Further the catalyst should preferably be added at a rate of 0.005 to 1 mole per mole of alkoxysilane, and more preferably at a rate of 0.01 to 0.8 mole.

Hydrolysis of alkoxysilane is performed under the atmospheric pressure at a temperature lower than a boiling point of the used solvent, and more preferably at a temperature 5 to 10° C. lower than the boiling point. When a heat-resistant and such pressure-resisting vessel as autoclave is used, the reaction can be performed at a temperature higher than the values above.

When hydrolysis is performed under the conditions as described above, polycondensation of alkoxysilane proceeds three-dimensionally, and silica particles for polishing with the particle diameter in the range from 5 to 300 nm can be obtained. Next, when alkoxysilane is hydrolyzed again together with the obtained particles, larger silica particles for polishing with the particle diameter in narrow range can be obtained.

Further the obtained silica particles may be subjected to the hydrothermal processing under the temperature of 150° C. or less, if necessary. By performing this hydrothermal processing, it is possible to reduce the carbon content to a required level or to improve the 10%-compressive elasticity modulus to a required value.

When the temperature under which the hydrothermal processing is performed exceeds 150° C. and especially exceeds 250° C., although it depends on the concentration of ammonia etc. coexisted, sometimes not monodispersed particles, but short fibrous silica particles each comprising several pieces of particles bonding to each other two-dimensionally may be obtained. When the short fibrous silica particles are used as polishing material, sometimes scratches may be generated, but dishing (excessive polishing) can be suppressed.

[Polishing agent (or polishing material)]

The polishing material according to the present invention is prepared by dispersing the silica particles for polishing described above in a dispersion medium. Although water is used as the dispersion medium, also such alcohols as methyl alcohol, ethyl alcohol, and isopropyl alcohol may be used according to the necessity, and in addition such water-soluble organic solvents as ethers, esters, and ketones may be used.

A concentration of silica particles for polishing in the polishing material should preferably be in the range from 2 to 50 weight %, and more preferably in the range from 5 to 30 weight %. When the concentration is less than 2 weight %, the concentration is too low for some types of substrates and insulating films, and in that case the polishing rate is too low to provide high productivity. When the concentration of silica particles is over 50 weight %, stability of the polishing material is insufficient, so that the polishing rate or the polishing efficiency can not further be improved, and sometimes dried materials may be generated and deposited on the substrate during the process of feeding a dispersion liquid for the polishing process, which may in turn generate scratches.

Any of such known additives as hydrogen peroxide, peracetic acid, urea peroxide, and a mixture thereof may be added to the polishing material according to the present invention, although the appropriate additive varies according to a type of a work to be polished. When such additive as hydrogen peroxide is used, the polishing rate can effectively be improved in the case of metallic work to be polished.

Further, such acids as sulfuric acid, nitric acid, phosphoric acid, and fluoric acid; sodium salts, potassium salts, and ammonium salts of these acids; and a mixture thereof may be added to the polishing material according to the present invention. When a plural types of works are polished with these additives, by making higher or lower the polishing rate for a particular work comprising specific components, finally a planarized surface can be obtained by polishing.

As other additives, imidazole, benzotriazole, benzotiazole, or the like may be used to prevent corrosion of a substrate by forming an immobilized layer or a dissolution suppressing layer on a surface of the metallic work to be polished.

Further such organic acids as citric acid, lactic acid, acetic acid, oxalic acid, and phtalic acid, or a complex forming agent for these organic acids may be added to the polishing material to disturb the immobilized layer.

Cationic, anionic, nonionic, or amphoteric surfactant may be added to the polishing material for improving dispersibility or stability of a slurry of the polishing material.

Further, pH of the slurry of polishing material may be adjusted by adding an acid or a base according to the necessity to improve the effect of adding each of the additives as described above.

With the present invention, since the silica particles for polishing contain a prespecified content of carbon and also have elasticity, the polishing rate with the polishing material comprising the particles for polishing can easily be controlled without any scratch generated, and a surface of a substrate can be polished into the extremely planarized and smooth state. Further the silica particles substantially contain no Na content, so that Na is not deposited on a surface of a semiconductor substrate or an oxidized film, and therefore the silica particles for polishing according to the present invention are extremely useful in planarizing a substrate, especially in forming a metal wiring layer in a semiconductor integrated circuit.

EXAMPLES

[Example 1]
Preparation of Silica Particles for Polishing (A)

A mixture solution prepared by mixing 139.1 grams of deionized water and 169.9 grams of methanol together was maintained under 60° C., and then 2982.5 grams of a mixture solution prepared by dissolving 532.5 grams of tetraethoxysilane (Tama Kagaku K. K., ethyl silicate 28, $SiO_2$: 28 weight %) in 2450 grams of a water-methanol mixture solution (water/methanol weight ratio of 2/8) and 596.4 grams of aqueous ammonia with the concentration of 0.25 weight % (Catalyst/alkoxysilane mole ratio=0.034) were concurrently added over 20 hours. After all of the components were added, the resultant mixture was further aged for 3 hours under the same temperature. Then un-reacted tetraethoxysilane, methanol, and ammonia were removed almost completely with an ultrafiltration membrane, and the mixture liquid was then refined with an amphoteric ion exchange resin and condensed with an ultrafiltration membrane to obtain a dispersion liquid of silica particles for polishing (A) with the solid phase concentration of 20 weight %. The average particle diameter, carbon content, and Na content of the silica particles for polishing (A) were measured, and the results are as shown in Table 1.

Preparation of Particles for Measurement of 10%-compressive Elasticity Modulus (A')

A mixture solution prepared by 139.1 grams of deionized water and 169.9 grams of methanol was maintained under 60° C., and then 298.3 grams of water-methanol solution of tetraethoxysilane having the same composition as that in Example 1 above (by one tenth of the quantity in Example 1) and 59.6 grams of aqueous ammonia with the concentration of 0.25 weight % (by one tenth of the quantity in Example 1) were added simultaneously to the mixture above, and the resultant mixture was agitated for 10 hours to prepare seed particles. In 10 hours, 2684. 3 grams of the remaining water-methanol solution of tetraethoxysilane and 536.8 grams of aqueous ammonia with the concentration of 0.25 weight % were added to the mixture solution over 18 hours. After all of the components were added, the resultant mixture was further aged for 3 hours under the same temperature. Then un-reacted tetraethoxysilane, methanol, and ammonia were removed with an ultrafiltration membrane almost completely, and the mixture solution was refined with an amphoteric ion exchange membrane and then condensed with an ultrafiltration membrane to obtain a dispersion liquid of particles (A') for measurement of 10%-compressive elasticity modulus with the solid phase concentration of 20 weight %. Then, the dispersion liquid was centrifuged and dried overnight under the temperature of 105° C., and the 10%-compressive elasticity modulus of particles were measured for the particles with particle diameter in the range from 2 to 3 $\mu$m, and the result is as shown in Table 1.

Polishing (1) Polishing material 333 grams of hydrogen peroxide solution with the concentration of 30 weight %, 5 grams of ammonium oxalate, and 162 grams of water were mixed together in 500 grams of dispersion liquid of particles (A) to prepare a polishing material (A) having the particle concentration of 10 weight %, hydrogen peroxide concentration of 10 weight %, and ammonium oxalate, concentration of 0.5 weight %.

(2) Substrate to be polished

A positive type of photoresist was coated on a silicon wafer with an insulating film (with the thickness of 0.4 $\mu$m) comprising silica laminated on an insulating film (with the thickness of 0.2 $\mu$m) comprising silicon nitrate, and an insulating film (with the thickness of 0.2 $\mu$m) comprising a silicon nitrate provided on the former, and 0.3 $\mu$m line and space exposure processing was performed. Then the exposed section was removed with a developer comprising tetramethyl ammonium hydride (TMAH). Then a pattern is formed on the under insulating film with a mixed gas comprising $CF_4$ and $CHF_3$, and then the resist was removed by applying the $O_2$ plasma to form a wiring groove with the width of 0.3 $\mu$m and depth of 0.6 $\mu$m. A thin copper layer is formed by means of the CVD method on the substrate with the wiring groove provided thereon, and further a film is formed by the electrolytic plating method so that a total thickness of the copper layer (sacrifice layer) on the insulating film was 0.2 $\mu$m to prepare the substrate to be polished.

(3) Polishing experiment

The substrate described above was set on a polishing device (manufactured by Nanofactor K. K.; NF300), and was polished under the conditions of the load on the substrate of 5 psi, the table rotating speed of 50 rpm and the spindle speed of 60 rpm feeding the polishing material (A) at the rate of 60 ml/minute until the sacrifice layer (with the thickness of 0.2 $\mu$m) on the insulating film was completely removed. The period of time required for this polishing process was 92 seconds, and the polishing rate is as shown in Table 1. The polished surface was observed with the planarity of the surface assessed according to the following criteria, and the result is shown in Table 1.

◯: Small scratches were observed a little.

Δ: Small scratches were observed in a wide area.

x: Large scratches were observed at several points.

[Example 2]
Manufacture of Silica Particles (B) for Polishing and Polishing With the Same A dispersion liquid of the silica particles for polishing (B) with the solid phase concentration of 20 weight % were prepared in the same manner as that in Example 1 except the point that ethanol was used in place of methanol. The polishing material (B) was prepared in the same manner as that in Example 1 except the point that the dispersion liquid of the particles for polishing (B) was used. Then the same type of sample substrate as that used in Example 1 was polished in the same manner, and the period of time required for polishing was 86 seconds.

Preparation of particles for measurement of 10%-compressive elasticity modulus (B')

Particles for measurement of 10%-compressive elasticity modulus (B') were prepared in the same manner as that in Example 1 for preparing the particles for measurement of 10%-compressive elasticity modulus (A') except the point that ethanol was used in place of methanol.

[Example 3]
Manufacture of Silica Particles for Polishing (C) and Polishing With the Same A dispersion liquid of the particles for polishing (C) with the solid phase concentration of 20 weight % was prepared in the same manner as that in Example 1 except the point that 596.4 grams of aqueous ammonia with the concentration of 0.06 weight % (catalyst/alkoxysilane molar ratio: 0.0082) was used in place of 596.4 grams of aqueous ammonia with the concentration of 0.25 weight %. The polishing material (C) was prepared in the same manner as that in Example 1 except the point that the dispersion liquid of the particles for polishing (C) was used. Then the sample substrate like that used in Example 1 was polishing, and the period of time required for polishing was 120 seconds.

Preparation of Particles for Measurement of 10%-compressive Elasticity Modulus (C')

Particles for measurement of 10%-compressive elasticity modulus (C') was prepared in the same manner as that in Example 1 except the point that aqueous ammonia with the concentration of 0.06 weight % was used in place of the aqueous ammonia with the concentration of 0.25 weight % for preparing the particles for measurement of 10%-compressive elasticity modulus (A').

[Example 4]

Manufacture of Silica Particles for Polishing (D) and Polishing With the Same

A mixture solution comprising 139.1 grams of deionized water and 169.9 grams of methanol was maintained under 60° C., and 2964 grams of a water-methanol solution (2450 grams of water/methanol mixture solution (weight ratio: 2/8)) of a mixture comprising 479.3 grams of tetraethoxysilane (manufactured by Tama Kagaku K. K.: ethyl silicate 28, $SiO_2$=28 weight %) and 34.7 grams of methyltrimethoxysilane (manufactured by Shin' etu Kagaku K.K.; $SiO_2$=44 weight %) and 596.4 grams of aqueous ammonia (catalyst/alkoxysilane molar ratio=0.034) with the concentration of 0.25 weight % were simultaneously added to the mixture solution above over 20 hours. After all of the compounds were added, the mixture was further aged for 3 hours under the same temperature. Then un-reacted tetraethoxysilane, methanol, and ammonia were removed almost completely with an ultrafiltration membrane and the mixture refined with an amphoteric ion exchange resin, and further condensed with an ultrafiltration membrane to obtain a dispersion liquid of silica particles (D) for polishing with the solid phase concentration of 20 weight %.

The polishing material (D) was prepared in the same manner as that in Example 1 except the point that the dispersion liquid of the particles for polishing (D) was used. Then the sample substrate was polished in the same manner as that in Example 1, and the period of time required for polishing was 144 seconds.

Preparation of Particles for Measurement of 10%-compressive Elasticity Modulus (D')

One tenth volume of the solution prepared by dissolving a mixture of tetraethoxysilane and methyltrimethoxysilane having the same compositions as those used in preparing the silica particles for polishing (D) in a water-methanol mixture solvent in stead of the water-methanol mixture solvent for tetraethoxysilane used for preparing the seed particles to prepare the particles (A') for measurement of 10%-compressive modulus and also one tenth volume of aqueous ammonia with the concentration of 0.25 weight % as compared to the volumes in Example 1 respectively were added all at once, and the resultant mixture was agitated for 10 hours like in Example 1 to prepare the seed particles. Then the remaining water-methanol mixture solution of tetraethoxysilane and methytrimethoxy silane and aqueous ammonia with the concentration of 0.25 weight % were added over 18 hours. After all of the compounds were added, the resultant mixture was further aged for 3 hours under the same temperature. Then un-reacted tetraethoxysilane, methanol, and ammonia were removed with an ultrafiltration membrane almost completely, refined with an amphoteric ion exchange membrane, and further condensed with an ultrafiltration membrane to obtain a dispersion liquid of particles for measurement of 10%-compressive elasticity modulus (D') with the solid phase concentration of 20 weight %.

[Comparative Example 1]

Manufacture of Silica Particles for Polishing (E) and Polishing With the Same

A dispersion liquid of the particles for polishing (E) was obtained by diluting a sol of silica (manufactured by C.C.I.C., Cataloid SI-50, average particle diameter: 25 nm, $SiO_2$ concentration: 48 weight %) to the $SiO_2$ concentration of 20 weight %. The polishing material (E) was prepared in the same manner as that in Example 1 except the point that the dispersion liquid of the particles for polishing (E) was used. Then the sample substrate was polished with the polishing material (E), and the period of time required for polishing was 86 seconds.

Preparation of Particles for Measurement of 10%-compressive Elasticity Modulus (E')

20.8 grams of sol of silica (manufactured by C.C.I.C., Cataloid SI-50, average particle diameter: 25 nm, $SiO_2$ concentration: 48 weight %) was diluted to the $SiO_2$ concentration of 1.5 weight %, and then NaOH aqueous solution was added to adjust pH to 10.5, and also temperature was adjusted to 85° C. 1500 grams of acidic silicic acid solution (pH 2.2, $SiO_2$=4.7 weight %) obtained by dealkylating diluted water glass with an ion exchange resin was added to the dispersion liquid of the particles over 10 hours, and then was aged for 1 hour. A portion of the obtained dispersion liquid of silica particles was diluted to the $SiO_2$ concentration of 1.5 weight %, and NaOH aqueous solution was added therein to prepare 667 grams of dispersion liquid with pH 10.5 and temperature of 85° C. Then 1500 grams of acidic silicic acid solution (with pH of 2.2 and the $SiO_2$ concentration of 4.7 weight %) was added to the dispersion liquid over 20 hours, and the resultant mixture was aged for 1 hour. This operation was repeated 3 to 6 times, and 1500 grams of acidic acid solution (with pH of 2.2 and $SiO_2$ concentration of 4.7 weight %) was added therein over 30 hours, 40 hours, 50 hours, and 60 hours respectively, and the mixture was further aged for 1 hour. Then the dispersion liquid of silica particles was washed with an ultrafiltration membrane until pH was controlled to 10 to prepare dispersion liquid of particles (E') for measurement of 10%-compressive elasticity modulus.

[Comparative Example 2]

Manufacture of Silica Particles for Polishing (F) and Polishing With the Same

A dispersion liquid of silica particles for polishing (F) with the solid phase concentration of 20 weight % was obtained in the same manner as that in Example 1 except the point that 596.4 grams of NaOH aqueous solution with the concentration of 0.59 weight % (catalyst/alkoxysilane molar ratio=0.034) was used in place of 596.4 grams of aqueous ammonia with the concentration of 0.25 weight % used in Example 1. The polishing material (F) was prepared like in the manner as that in Example 1 except the point that dispersion liquid of the particles for polishing (F) was used. Then the sample substrate was polished with the polishing material (F) in the same manner as that in Example 1, and the period of time required for polishing was 86 seconds.

Preparation of Particles for Measurement of 10%-compressive Elasticity Modulus (F')

Particles for measurement of 10%-compressive elasticity modulus (F') were prepared in the same manner as that in Example 1 except the point that NaOH aqueous solution with the concentration of 0.59 weight % was used in place of the aqueous ammonia with the concentration of 0.25 weight % used for preparation of the particles (A') for measurement of 10%-compressive elasticity modulus in Example 1.

[Comparative Example 3]
Manufacture of Silica Particles for Polishing (G) and Polishing With the Same A mixture solution prepared by mixing 139.1 grams of deionized water and 169.9 grams of methanol together was maintained under 60° C., and then 2982.5 grams of a mixture solution prepared by dissolving 532.5 grams of tetraethoxysilane (Tama Kagaku K. K., ethyl silicate 28, $SiO_2$: 28 weight %) in 2450 grams of a water-methanol mixture solution (water/methanol weight ratio of 2/8) and 596.4 grams of aqueous ammonia with the concentration of 0.25 weight % (Catalyst/alkoxysilane mole ratio=0.034) were concurrently added over 20 hours. After all of the components were added, the resultant mixture was further aged for 3 hours under the same temperature. Then un-reacted tetraethoxysilane, methanol, and ammonia were removed almost completely with an ultrafiltration membrane, and then deionized water was added to control the silica concentration to 1 weight %.

Then the mixture solution was subjected to the hydrothermal processing for 10 hours in an autoclave. After the hydrothermal processing, the solution was refined with an amphoteric ion exchange resin, and condensed with an ultrafiltration membrane to obtain a dispersion liquid of silica particles (G) for polishing with the solid phase concentration of 20 weight %.

The polishing material (G) was prepared like in the manner as that in Example 1 except the point that dispersion liquid of the particles for polishing (G) was used. Then the sample substrate was polished with the polishing material (G) in the same manner as that in Example 1, and the period of time required for polishing was 92 seconds.

Preparation of Particles for Measurement of 10%-compressive Elasticity Modulus (G')

A dispersion liquid of the particles(A') for measurement of 10%-compressive elasticity modulus with the solid phase concentration of 20 weight % was obtained in the same manner as that in Example 1, and deionized water was added therein to adjust the silica concentration to 1 weight %. Then the dispersion liquid was hydrothermally processed for 15 hours in an autoclave maintained under 220° C. In the hydrothermal processing, the solution was refined with an amphoteric ion exchange resin and condensed with an ultrafiltration membrane to obtain a dispersion liquid of silica particles (G') for measurement of 10%-compressive elasticity modulus with the solid phase concentration of 20 weight %.

[Comparative Example 4]
Manufacture of Silica Particles for Polishing (H)

A dispersion liquid of silica particles for polishing (H) with the solid phase concentration of 20 weight % was obtained in the same manner as that in Example 1 except the point that 169.9 grams of ethanol/isopropanol (weight ratio: 8/2) mixture solvent was used in place of 169.9 grams of methanol and further 2450 grams of water/ethanol/isopropanol (weight ratio: 2/6.4/1.6) mixture solvent was used in place of the water-methanol mixture solvent (weight ratio : 2/8).

The polishing material (H) was prepared in the same manner as that in Example 1 except the point that dispersion liquid of the particles for polishing (H) was used. Then the sample substrate was polished in the same manner as that in Example 1. The polishing rates employed in this process are as shown in Table 1.

Preparation of Particles for Measurement of 10%-compressive Elasticity Modulus (H')

A dispersion liquid of particles for measurement of 10%-compressive elasticity modulus (H') with the solid phase concentration of 20 weight % was obtained except the point that the ethanol/isopropanol mixture solvent (weight ratio: 8/2) was used in place of the methanol used for preparing the particles (A') for 10%-compressive elasticity modulus employed in Example 1.

[Comparative Example 5]
Manufacture of Silica Particles for Polishing (I)

A dispersion liquid of silica particles for polishing (I) with the solid phase concentration of 20 weight % was obtained in the same manner as that in Example 1 except that a mixture of 302.9 grams of tetramethoxysilane and 41.2 grams of γ-methacryloxypropyltrimethoxy silane was used in place of 532.5 grams of tetraethoxysilane employed in Example 1.

The polishing material (I) was prepared in the same manner as that in Example 1 except the point that the dispersion liquid of particles for polishing (I) was used. Then the sample substrate like that used in Example 1 was polished in the same manner. The polishing rates employed in this process are as shown in Table 1.

Preparation of Particles for Measurement of 10%-compressive Elasticity Modulus (I')

A dispersion liquid of particles for measurement of 10%-compressive elasticity modulus (I') with the solid phase concentration of 20 weight % was obtained in the same manner as that in Example 1 except the point that a mixture of 30.3 grams of tetramethoxysilane and 14.1 grams of γ-methacryloxypropyltrimethoxysilane was used in place of 53.3 grams of tetraethoxysilane used for preparing the particles (A') for measurement of 10%-compressive elasticity modulus employed in Example 1.

[Comparative Example 6]
Manufacture of Silica Particles for Polishing (J)

A dispersion liquid of silica particles for polishing (J) with the solid phase concentration of 20 weight % was obtained in the same manner as that in Example 1 except the point that a mixture of 190.3 grams of tetramethoxysilane and 170.3 grams of γ-methacryloxypropyltrimethoxy silane was used in place of 532.5 grams of tetraethoxysilane used in Example 1.

The polishing material (J) was prepared in the same manner as that in Example 1 except the point that dispersion liquid of the particles for polishing (J) was used. Then the sample substrate like that used in Example 1 was polished with the polishing material (J), and the polishing rate is as shown in Table 1.

Preparation of Particles for Measurement of 10%-compressive Elasticity Modulus (J')

A dispersion liquid of particles (J') for measurement of 10%-compressive elasticity modulus with the solid phase concentration of 20 weight % was obtained in the same manner as that in Example 1 except that a mixture of 19.0 grams of tetramethoxysilane and 17.0 grams of γ-methacryloxypropyl trimethoxysilane was used in place of 53.3 grams of tetraethoxysilane used in Example 1 for preparation of the particles (A') for measurement of 10%-compressive elasticity modulus.

TABLE 1

|  | Silica particles for polishing | | | | Results of polishing | |
| --- | --- | --- | --- | --- | --- | --- |
|  | p. diameter (nm) | C (wt %) | Na (ppm) | 10% c.e.m. (kgf/mm²) | Polish rate (nm/min) | Planarity |
| Example 1 | 25 | 1.1 | 0.1 | 2300 | 130 | ○ |
| Example 2 | 40 | 1.2 | 0.5 | 2200 | 140 | ○ |
| Example 3 | 18 | 1.1 | 0.3 | 2200 | 100 | ○ |
| Example 4 | 20 | 3.1 | 0.2 | 1700 | 90 | ○ |
| Comp Ex 1 | 25 | <0.1 | 4200 | 4200 | 140 | X |
| Comp Ex 2 | 20 | 0.2 | 1900 | 3800 | 140 | X |
| Comp Ex 3 | 20 | 0.3 | 0.5 | 3700 | 130 | X |
| Comp Ex 4 | 48 | 5.2 | 0.3 | 1600 | 80 | Δ |
| Comp Ex 5 | 38 | 19.0 | 0.2 | 1100 | 70 | Δ |
| Comp Ex 6 | 29 | 9.4 | 0.5 | 450 | 50 | Δ |

What is claimed is:

1. Silica particles for polishing having a three-dimensional polycondensation structure with an average particle diameter in a range from 5 to 300 nm, said silica particles having residual alkoxy groups therein and a carbon content in a range from 0.5 to 5 weight % retained in the residual alkoxy groups.

2. Silica particles for polishing according to claim 1, wherein said silica particles have a 10%-compressive elasticity modulus in a range from 500 to 3000 kgf/mm², said 10%-compressive elasticity modulus being obtained by applying a load at a predetermined loading rate to a particle, deforming the particle until a compression displacement reaches 10% of a particle diameter, measuring a load and a compression displacement (mm) at the 10% displacement, and substituting the particle diameter and the measured compression load and compression displacement into a following equation:

$$K=(3/\sqrt{2}) \times F \times S^{-3/2} \times D^{-1/2}$$

wherein K indicates the 10%-compressinve elasticity modulus (kgf/mm²), F indicates a compression load (kgf), S indicates the compression displacement (mm), and D indicates the particle diameter (mm).

3. Silica particles for polishing according to claim 2, wherein Na content is less than 100 ppm.

4. A polishing agent containing the silica particles according to claim 1.

5. A polishing agent containing the silica particles according to claim 2.

6. A polishing agent containing the silica particles according to claim 3.

7. Silica particles for polishing according to claim 1, wherein carbon as the carbon content is included only in the residual alkoxy groups.

* * * * *